United States Patent Office 2,837,588
Patented June 3, 1958

---

2,837,588

POLYMERIZATION OF TERTIARY OLEFINS

Ernest J. Kahler, Columbus, Ohio, assignor, by mesne assignments, to Pennsalt Chemicals Corporation, a corporation of Pennsylvania No Drawing. Application July 12, 1956
Serial No. 597,356

4 Claims. (Cl. 260—683.15)

This invention relates to the polymerization of hydrocarbons containing a tertiary olefin group. More particularly, this invention relates to the polymerization of these unsaturated hydrocarbons in the presence of compounds of the class of $P_2X_5NO$ wherein X is halogen.

There are many known methods for the polymerization of olefinic hydrocarbons. Of major importance, for example, is the polymerization of the unsaturated constituents in certain cuts of cracked gasoline, such as the fractions containing the various butenes. The butenes in these fractions can be polymerized in the presence of sulfuric acid or phosphoric acid. In the instance of sulfuric acid the isobutene can be selectively polymerized under mild, low-temperature conditions. Under elevated temperatures, the other butenes will also polymerize with the isobutene to form mixed polymers.

Applicant has discovered that unsaturated hydrocarbons containing a tertiary olefinic group, such as in the case of isobutene, can be polymerized in the presence of compounds of class $P_2X_5NO$, wherein X is halogen.

The compound, $P_2X_5NO$, wherein X is halogen, and the process for making this compound, is disclosed in the copending application Serial No. 565,794, filed February 16, 1956. As disclosed in said copending application, the compound has the structural formula

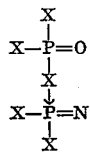

These compounds can be prepared by the reaction of phosphorus pentahalide with a mineral acid salt of hydroxyl amine. The phosphorus pentahalide used as a starting material in this reaction, of course, is the halide desired in the $P_2X_5NO$. It is preferable to use a hydrogen halide salt of hydroxyl amine because the volatile nature of the hydrogen halide permits easy separation of the hydrogen halide from the reaction mixture. As disclosed in said copending application, the reaction may be conducted in the presence of a suitable solvent conveniently selected for enabling easy separation of the compound $P_2X_5NO$ from the reaction mixture. The copending application Serial No. 565,794 should be consulted for more detailed information concerning the production of these compounds.

The following examples are presented for the purpose of illustrating the invention, it being understood that the invention is not intended to be restricted to the specific illustrative examples and that other specific modifications are included by the invention. The parts are by weight unless otherwise stated.

*Example I*

In the polymerization of isobutene the gaseous isobutene was passed in contact with the compound $P_2X_5NO$ at room temperature. Thus, polymerization of the isobutene was accomplished by passing the gaseous isobutene through 0.01 mole of $P_2Cl_5NO$. A mixture of the dimer, trimer, and tetramer of isobutene was thus obtained and separated from the $P_2Cl_5NO$. Fractional distillation showed the distribution of the isobutene polymers to be 34 percent of the dimer, 62 percent of the trimer, and 4 percent of the tetramer.

*Example II*

Following substantially the procedure in Example I other unsaturated hydrocarbons containing a tertiary olefinic group, including mixtures of these hydrocarbons, may be polymerized, for example, 2-phenylpropene, p-methyl-2-phenylpropene, 2-naphthylpropene, etc., in all instances the compounds necessarily containing a terminal olefinic group. Generally, higher temperatures are necessary for the polymerization of the higher molecular weight unsaturated hydrocarbons.

If desired the polymerization reaction may be conducted with the $P_2X_5NO$ dissolved in a solvent. Suitable solvents for the $P_2X_5NO$ are aromatic hydrocarbons, aliphatic hydrocarbons, chlorinated hydrocarbons and ethers. Separation of the solvent and $P_2X_5NO$ from the polymerized products may then be accomplished by distillation. From the particular embodiments of this invention disclosed herein, it will be obvious to those skilled in the art that various changes and modifications may be made without departing from the invention in its broader aspects. Therefore, the appended claims are intended to cover all such changes and modifications.

What is claimed is:

1. The method which comprises polymerizing tertiary olefins in the presence of $P_2X_5NO$ wherein X is halogen.
2. The method which comprises polymerizing tertiary olefins in the presence of $P_2Cl_5NO$.
3. The method which comprises polymerizing isobutene in the presence of $P_2X_5NO$ wherein X is halogen.
4. The method which comprises polymerizing isobutene in the presence of $P_2Cl_5NO$.

References Cited in the file of this patent

UNITED STATES PATENTS 2,171,207    Boultbee _____ Aug. 29, 1939

OTHER REFERENCES

Besson et al.: "Sur le chlorazature de phosphore," Comp. Ren. Tome 1943, July–December 1906, page 38.